United States Patent [19]

Hosoi

[11] Patent Number: 5,596,732
[45] Date of Patent: Jan. 21, 1997

[54] METHOD OF OPTIMIZING INSTRUCTION SEQUENCE OF COMPILER

[75] Inventor: Akira Hosoi, Kawasaki, Japan

[73] Assignee: Fujitsu Limited, Kawasaki, Japan

[21] Appl. No.: 253,138

[22] Filed: Jun. 2, 1994

[30] Foreign Application Priority Data

Oct. 19, 1993 [JP] Japan .................................. 5-260492

[51] Int. Cl.$^6$ ................................................ G06F 9/45
[52] U.S. Cl. ................. 395/709; 395/706; 364/280.5; 364/262.4; 364/973
[58] Field of Search ....................... 395/700, 375

[56] References Cited

U.S. PATENT DOCUMENTS 5,287,467  2/1994  Blaner et al. ........................ 395/375
5,394,529  2/1995  Brown et al. ........................ 395/375

*Primary Examiner*—David Y. Eng
*Attorney, Agent, or Firm*—Staas & Halsey

[57] ABSTRACT

An overhead on a pipeline computer of an instruction sequence including branch instructions is reduced. In the case where an instruction sequence of a source program is converted by a compiler into an instruction sequence which can be executed by the pipeline computer, the instruction sequence including the branch instructions is detected from among the instruction sequences which can be executed by the pipeline computer. Subsequently, the detected instruction sequence including the branch instructions is converted into an equivalent instruction sequence including no branch instruction.

8 Claims, 19 Drawing Sheets

FIG. 1 PRIOR ART

| [ASSEMBLY LANGUAGE] | [EXPRESSION] | [CONTENTS] |
|---|---|---|
| IF PART ⎧ ① mov %r10, %r1 | r1=r10 | THE CONTENT OF REGISTER r10 IS INPUT TO REGISTER r1. |
| ② mov %r11, %r2 | r2=r11 | THE CONTENT OF REGISTER r11 IS INPUT TO REGISTER r2. |
| ③ cmp %r3, 0<br>ble L1<br>nop | r3≧0 | IS THE CONTENT OF REGISTER r3 EQUAL TO OR LARGER THAN 0? THE LABEL L1 INDICATIVE OF BRANCH DESTINATION. EMPTY. |
| THEN PART ⎧ ④ mov %r20, %r1 | r1=r20 | THE CONTENT OF REGISTER r20 IS INPUT TO REGISTER r1. |
| ⑤ mov %r21, %r2<br>L1; | r2=r21 | THE CONTENT OF REGISTER r21 IS INPUT TO REGISTER r2. |
| ⑥ add %r1, %r2, %r3 | r3=r1+r2 | THE VALUE IN WHICH THE CONTENTS OF REGISTERS r1 AND r2 WERE ADDED IS INPUT TO REGISTER r3. |

[PROCESSING ROUTE]

① → ② → ③ → ④ → ⑤ → ⑥

$r3 \geq 0$ NO BRANCH $r3 < 0$ BRANCHED (from ③ to ⑥)

FIG. 8

| [ASSEMBLY LANGUAGE] | [EXPRESSION] | [CONTENTS] | [PROCESSING ROUTE] |
|---|---|---|---|
| IF PART { ① cmp %r3, 0 | r3≧0 | IS THE CONTENT OF REGISTER r3 EQUAL TO OR LARGER THAN 0? | ① → ② |
| ② add %r10, %r11, %r1 | r1=r10+r11 | THE VALUE IN WHICH THE CONTENTS OF REGISTERS r10 AND r11 WERE ADDED IS INPUT TO REGISTER r1. THE LABEL L1 INDICATIVE OF BRANCH DESTINATION EMPTY. | BRANCHED |
| ble L1 nop | | | |
| THEN PART { ③ add %r12, %r13, %r1 | r1=r12+r13 | THE VALUE IN WHICH THE CONTENTS OF REGISTERS r12 AND r13 WERE ADDED IS INPUT TO REGISTER r1. | NO BRANCH → ③ |
| L1; | | | |
| ④ add %r1, %r5, %r2 | r2=r1+r5 | THE VALUE IN WHICH THE CONTENTS OF REGISTERS r1 AND r5 WERE ADDED IS INPUT TO REGISTER r2. | → ④ |

FIG. 9

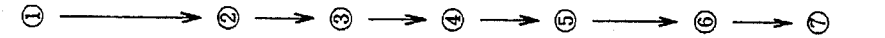

| [ASSEMBLY LANGUAGE] | [EXPRESSION] | [CONTENTS] | [PROCESSING ROUTE] |
|---|---|---|---|
| ① cmp, le %r3, 0, %r7 | WHEN r3≧0, r7=−1<br>WHEN r3<0, r7=0 | IS THE CONTENT OF REGISTER r3 EQUAL TO OR LARGER THAN 0? WHEN IT IS EQUAL TO OR LARGER, −1 IS INPUT TO REGISTER r7. WHEN IT IS SMALLER, 0 IS INPUT TO REGISTER r7. | ① |
| ② add %r10, %r11, %r1 | r1=r10+r11 | THE VALUE IN WHICH THE CONTENTS OF REGISTERS r10 AND r11 WERE ADDED IS INPUT TO REGISTER r1. | ② |
| ③ add %r12, %r13, %r8 | r8=r12+r13 | THE VALUE IN WHICH THE CONTENTS OF REGISTERS r12 AND r13 WERE ADDED IS INPUT TO REGISTER r8. | ③ |
| ④ sub %r8, %r1, %r8 | r8=r8−r1 | THE VALUE IN WHICH REGISTER r1 WAS SUBTRACTED FROM REGISTER r8 IS INPUT TO REGISTER r8. | ④ |
| ⑤ and %r8, %r7, %r8 | r8=r8&r7 | THE AND OF REGISTERS r7 AND r8 IS INPUT TO REGISTER r8. WHEN r7=−1, r8 IS EFFECTIVE. WHEN r=0, r8 IS INVALID. | ⑤ |
| ⑥ add %r1, %r8, %r1 | r1=r1+r8 | THE VALUE IN WHICH THE CONTENTS OF REGISTERS r1 AND r8 WERE ADDED IS INPUT TO REGISTER r1. | ⑥ |
| ⑦ add %r1, %r2, %r5 | r5=r1+r2 | THE VALUE IN WHICH THE CONTENTS OF REGISTERS r1 AND r2 WERE ADDED IS INPUT TO REGISTER r5. | ⑦ |

FIG. 10

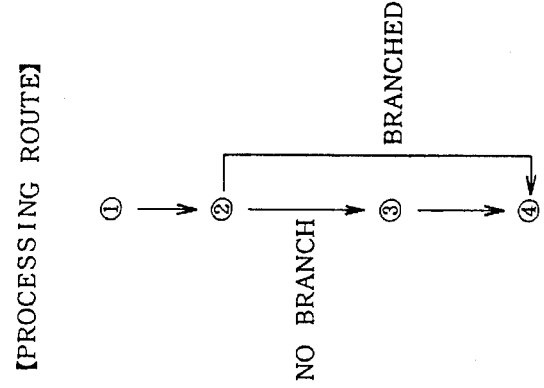
[PROCESSING ROUTE]

| | [ASSEMBLY LANGUAGE] | [EXPRESSION] | [CONTENTS] |
|---|---|---|---|
| IF PART | ① cmp %r3, 0 | r3≧0 | IS THE CONTENT OF REGISTER r3 EQUAL TO OR LARGER THAN 0? |
| | ② mov -1, %r1<br>ble L1<br>nop | r1=-1 | -1 IS INPUT TO REGISTER r1. THE LABEL L1 INDICATIVE OF BRANCH DESTINATION. EMPTY. |
| THEN PART | ③ mov 1, %r1<br>L1; | r1=1 | 1 IS INPUT TO REGISTER r1. |
| | ④ add %r1, %r2, %r3 | r3=r1+r2 | THE VALUE IN WHICH THE CONTENTS OF REGISTERS r1 AND r2 WERE ADDED IS INPUT TO REGISTER r3. |

FIG. 11

| [ASSEMBLY LANGUAGE] | [EXPRESSION] | [CONTENTS] | [PROCESSING ROUTE] |
|---|---|---|---|
| ① cmp, le %r3, 0, %r7 | WHEN $r3 \geq 0$, $r7=-1$ <br> WHEN $r3<0$, $r7=0$ | IS THE CONTENT OF REGISTER r3 EQUAL TO OR LARGER THAN 0? WHEN IT IS EQUAL TO OR LARGER, −1 IS INPUT TO REGISTER r7. WHEN IT IS SMALLER, 0 IS INPUT TO REGISTER r7. | ① → ② → ③ → ④ → ⑤ |
| ② mov −1, %r1 | $r1=-1$ | −1 IS INPUT TO REGISTER r1. | |
| ③ and %r7, 2, %r8 | $r8=r7 \& 2$ | THE AND OF REGISTER r7 AND DIFFERENCE 2 BY THE PRESENCE OR ABSENCE OF BRANCH IS CALCULATED AND INPUT TO REGISTER r8. WHEN $r7=-1$, $r8=2$. WHEN $r=0$, $r8=0$. | |
| ④ add %r1, %r8, %r1 | $r1=r1+r8$ | THE VALUE IN WHICH THE CONTENTS OF REGISTERS r1 AND r8 WERE ADDED IS INPUT TO REGISTER r1. | |
| ⑤ add %r1, %r2, %r3 | $r3=r1+r2$ | THE VALUE IN WHICH THE CONTENTS OF REGISTERS r1 AND r2 WERE ADDED IS INPUT TO REGISTER r3. | |

FIG. 14

| | [ASSEMBLY LANGUAGE] | [EXPRESSION] | [CONTENTS] |
|---|---|---|---|
| IF PART | ① cmp %g2, 0<br>ble L2<br>nop | $g2 \geqq 0$ | IS THE CONTENT OF REGISTER g2 EQUAL TO OR LARGER THAN 0? THE LABEL INDICATIVE OF BRANCH DESTINATION. EMPTY. |
| THEN PART | ② ld c, %g2 | | LOAD c INTO REGISTER g2. |
| | ③ add %g2, 1, %g3 | $g3 = g2 + 1$ | THE VALUE IN WHICH THE CONTENTS OF REGISTERS g2 AND 1 WERE ADDED IS INPUT TO REGISTER g3. |
| | ④ ld b, %g2 | | LOAD b INTO REGISTER g2. |

[PROCESSING ROUTE]

① → ② → ③ → ④

NO BRANCH (NOT TAKEN)

BRANCHED (TAKEN)

FIG. 15

| [ASSEMBLY LANGUAGE] | [EXPRESSION] | [CONTENTS] | [PROCESSING ROUTE] |
|---|---|---|---|
| ① cmp le %g2, 0, %r0 | WHEN g2≧0, r2=-1<br>WHEN g2<0, r2=0 | IS THE CONTENT OF REGISTER g2 EQUAL TO OR LARGER THAN 0? WHEN IT IS EQUAL TO OR LARGER, -1 IS INPUT TO REGISTER r0. WHEN IT IS SMALLER, 0 IS INPUT TO REGISTER g2. | ① |
| ② ld c, %g2 | | LOAD c INTO REGISTER g2. | ② |
| ③ add %g2, 1, %g2 | g2=g2+1 | THE VALUE IN WHICH THE CONTENTS OF REGISTERS g2 AND 1 WERE ADDED IS INPUT TO REGISTER g2. | ③ |
| ④ sub %g2, %g0, %g2 | g2=g3-g2 | THE VALUE IN WHICH REGISTER g2 WAS SUBTRACTED FROM REGISTER g3 IS INPUT TO REGISTER g2. | ④ |
| ⑤ and %g0, %g0, %g2 | g2=g3&g2 | THE AND OF REGISTERS r0 AND g2 IS INPUT TO REGISTER g2. WHEN r0=-1, g2=2. WHEN r0=0, g2=0. | ⑤ |
| ⑥ add %g3, %g2, %g3<br>L2; | g3=g3+g2 | THE VALUE IN WHICH THE CONTENTS OF REGISTERS g3 AND g2 WERE ADDED IS INPUT TO REGISTER g3. | ⑥ |
| ⑦ ld b, %g2 | | LOAD b INTO REGISTER g2. | ⑦ |

FIG. 17

[PROCESSING ROUTE]

```
         g3≤0
        (NOT SATISFIED)
  ①─────────────────────→ ④ → ⑤
   │                              ↓
   │  g3>0                        
   │ (SATISFIED)                  
   └──→ ② → ③ ─────────────────→ ⑥
            THEN            ELSE
```

| | [ASSEMBLY LANGUAGE] | [EXPRESSION] | [CONTENTS] |
|---|---|---|---|
| IF PART | ① cmp %g3, 0<br>ble L2<br>nop | $g3 \geq 0$ | IS THE CONTENT OF REGISTER g3 EQUAL TO OR LARGER THAN 0? THE LABEL INDICATIVE OF BRANCH DESTINATION. EMPTY. |
| THEN PART | ② ld a, %g2<br>b L4 | | LOAD a INTO REGISTER g2. INTO L4 UNCONDITIONALLY. |
| THEN PART | ③ add %g2, 1, %g2<br>L2: | $g2 = g2 + 1$ | THE VALUE IN WHICH THE CONTENTS OF REGISTERS g2 AND 1 WERE ADDED IS INPUT TO REGISTER g2. |
| ELSE PART | ④ ld a, %g2 | | LOAD a INTO REGISTER g2. |
| | ⑤ add %g2, 2, %g2<br>L4: | $g2 = g2 + 1$ | THE VALUE IN WHICH THE CONTENTS OF REGISTERS g2 AND 2 WERE ADDED IS INPUT TO REGISTER g2. |
| | ⑥ st %g2, [%g3, +%lo(b)] | | THE CONTENT OF REGISTER g2 IS STORED INTO CALCULATING ADDRESS OF [%g3, +%lo(b)]. |

FIG. 19

| [ASSEMBLY LANGUAGE] | [EXPRESSION] | [CONTENTS] | [PROCESSING ROUTE] |
|---|---|---|---|
| ① cmp le %g3, 0, %r0 | WHEN $g3 \geq 0$, $r0 = -1$ <br> WHEN $g2 < 0$, $r0 = 0$ | IS THE CONTENT OF REGISTER g3 EQUAL TO OR LARGER THAN 0? WHEN IT IS EQUAL TO OR LARGER, $-1$ IS INPUT TO REGISTER r0. WHEN IT IS SMALLER, 0 IS INPUT TO REGISTER r0. | ① |
| ② ld a, %g2 | | LOAD a INTO REGISTER g2. | ↓ <br> ② |
| ③ add %r2, 1, %r2 | $g2 = g2 + 1$ | THE VALUE IN WHICH THE CONTENTS OF REGISTERS g2 AND 1 WERE ADDED IS INPUT TO REGISTER g2. | ↓ <br> ③ |
| ④ and %r0, 1, %r0 | $r0 = r0 \& 1$ | THE AND OF REGISTER r0 AND DIFFERENCE 1 DUE TO PRESENCE OR ABSENCE OF BRANCH IS INPUT TO REGISTER r0. WHEN $r0 = -1$, $r0 = 1$. WHEN $r0 = 0$, $r0 = 0$. | ↓ <br> ④ |
| ⑤ add %g3, %g2, %g3 <br> L2; <br> L4; | $g3 = g3 + g2$ | THE VALUE IN WHICH THE CONTENTS OF REGISTERS g3 AND g2 WERE ADDED IS INPUT TO REGISTER g3. | ↓ <br> ⑤ |
| ⑥ st %g2, [%g3, +%lo(b)] | | THE CONTENT OF REGISTER g2 IS STORED INTO CALCULATING ADDRESS OF [%g3, +%lo(b)]. | ↓ <br> ⑥ |

METHOD OF OPTIMIZING INSTRUCTION SEQUENCE OF COMPILER

BACKGROUND OF THE INVENTION

The present invention relates to an instruction sequence optimizing method of a compiler for converting a source program into an assembly language which can be executed by a pipeline computer and, more particularly, to an instruction sequence optimizing method of a compiler for instruction sequences of the IF~THEN type and IF~THEN~ELSE type as targets.

The compiler which is known as a language processor converts a source program described by a programming language such as FORTRAN, COBOL, PL/I, or the like into an assembly language or a machine language which can be executed by a computer, thereby forming a target program. In such a compiler, at a stage after completion of the conversion and formation into an intermediate code, an optimizing process of the code is executed. By optimizing the code, the intermediate code can be converted into an instruction sequence which is executed by a minimum capacity and at a highest speed on the computer for executing the program, so that such a code optimization largely contributes to the improvement of the performance of the compiler.

Hitherto, for example, a program having steps 1 to 6 including a branch instruction shown in FIG. 1 is executed. FIG. 1 shows an example of the program of the IF~THEN type including a branch instruction which was converted by the conventional compiler. The program is shown by the assembly language. Numerical formula-like meanings, contents, and further a processing procedure are also shown as processing routes. In the assembly language, "%" shows a register. For instance, "%r10" denotes a register r10. "mov" denotes a moving instruction, "cmp" indicates a comparing instruction, "ble" an index indicative of a branch destination label, and "add" an adding instruction.

In FIG. 1, the comparing instruction "cmp" in step 3 provided after the moving instruction "mov" in step 2 subsequent to an IF part in step 1 compares and judges whether the content of a register r3 is equal to or larger than 0 or not, namely, register r3≧0.

When the above comparison condition is satisfied, there is no branch (hereinafter, a state in which the processing routine is not branched is also referred to as "branch is not taken"), so that a branch instruction "ble L1" is skipped and instructions in steps 4 and 5 as a THEN part are sequentially executed in accordance with the order. On the other hand, when the condition of the comparing instruction is not satisfied (r3<0) in step 3, there is a branch (hereinafter, a state in which the processing routine is branched is also referred to as "branch is taken"). The processing routine is branched to a label L1 shown by the branch instruction "ble L1" and an operating instruction "add" is executed in step 6.

However, hitherto, the existence of the branch instruction in the program becomes a cause of deterioration of the performance of a pipeline computer. For example, in the program of the IF~THEN type in FIG. 1, THEN parts in instruction steps 4 and 5 are executed or are not executed in accordance with the result of the comparing instruction in step 3. Therefore, the conventional pipeline computer copes with such a program including the branch instruction as follows.

First, an assumption such that "all of the branch instructions are not branched" is made. For this purpose, even if a branch instruction appears, an instruction fetch is continued while ignoring such a branch instruction and the instructions are sequentially executed in accordance with the order. For instance, the pipeline computer has a construction of four stages: a fetch stage F; a first execution stage E1; a second execution stage E2; and a write stage W. Therefore, in each cycle, the instructions are sequentially fetched to the stage F and, at the same time, the precedent instructions are moved to the stages E1, E2, and W. Therefore, in the case where the comparison condition is satisfied and there is no branch (not taken), it is sufficient to continue the instruction execution cycle of the pipeline computer, so that an overhead doesn't occur. However, in the case where the comparison condition is not satisfied and there is a branch (taken), the instruction such that the processing stage has been progressed on the assumption that the processing routine is not branched must be cancelled. It takes a time to execute processes by a time corresponding to such a cancelling operation. It also takes a time to fetch the instruction on the branch destination side and there is a problem such that the overhead increases.

A method of predicting whether the branch instruction is branched or not is also considered as another method. It is, however, generally difficult to perfectly predict whether the branch instruction is taken or not, so that an overhead of the branch certainly occurs. Particularly, in a parallel machine at an instruction level such as VLIW (Very Long Instruction Words) or superscalar, there is a tendency such that the overhead due to the branch instruction further increases.

SUMMARY OF THE INVENTION

According to the present invention, there is provided an instruction sequence optimizing method of a compiler in which an overhead on a pipeline computer of an instruction sequence including a branch instruction is reduced.

First, the invention relates to a compiler for converting an instruction sequence of a source program described by a predetermined programming language into an instruction sequence which can be executed by a pipeline computer. As an instruction sequence optimizing method of such a compiler, the invention comprises the following processing steps:

I. a detecting step of detecting an instruction sequence including a branch instruction from an instruction sequence which can be executed by the pipeline computer: and II. a converting step of converting the instruction sequence including the branch instruction detected in the detecting step I into the equivalent instruction sequence including no branch instruction.

Specifically speaking, in the case where an instruction sequence of the IF~THEN type is detected in the detecting step I, a conversion according to the following processing steps is executed in the converting step II:

[First step]

A comparison instruction of the IF part of the instruction sequence of the IF~THEN part is arranged as it is.

[Second step]

In the case where a comparison condition due to the execution of the comparing instruction is satisfied and there is no branch, an effective coefficient is stored into a value of a predetermined general register. On the other hand, in the case where the comparison condition is not satisfied and there is a branch, a register storing instruction to store an invalid coefficient into a value of a general register is formed and arranged.

[Third step]

An operating instruction to obtain a difference between the value which is obtained in the case where a instruction of the THEN part was executed as a result of that there is no branch due to the execution of the comparing instruction and the value which is obtained in the case where the instruction in the THEN part was skipped by the branch instruction because there is a branch is formed and arranged.

[Fourth step]

An AND operating instruction to calculate the AND between the value which is obtained by executing the operating instruction of the difference due to the presence or absence of the branch in the third step and an effective coefficient or an invalid coefficient stored in a general register by an arranging instruction in the second step is formed and arranged.

[Fifth step]

An adding instruction to add the value which is obtained by executing the AND operating instruction formed and arranged in the fourth step to a value which is used in the instruction on the merging destination side is formed and arranged.

[Sixth step]

An operating instruction at the merging position is arranged as it is.

Since the comparing instruction which is arranged in the first step and the register storing instruction of the effective or invalid coefficient which is arranged in the second step can be executed in one instruction cycle of the pipeline computer, they are integrated and arranged as one instruction which is executed in one cycle. In the second step, the storing instruction stores a numerical value "−1" in which all bits are equal to 1 into the general register as an effective coefficient. As an invalid coefficient, a numerical value "0" in which all bits are equal to 0 is stored into the general register.

In the converting step II of the invention, in the case where the storing instructions having the same address exist at the position subsequent to the branch instruction of the IF part and in the THEN part, they are integrated to the precedent storing instruction and, after that, the above steps 1 to 6 are applied and the instruction sequence is converted into the equivalent instruction sequence including no branch instruction.

Further, in the converting step II of the invention, in the instructions of the THEN part in case of no branch, the instructions which exert no side effect even after completion of the branch are left as they are. In this state, they are converted into the equivalent instruction sequence including no branch instruction by applying the above steps 1 to 6.

Furthermore, in the converting step II of the invention, in the case where the instruction sequence of the IF–THEN–ELSE type is detected in the detecting step I, the instruction movement is executed under the conditions such that the same instruction exists in each of the THEN part when the conditions are not satisfied due to the comparing instruction of the IF part and the ELSE part when the conditions are satisfied and that even if the instructions are integrated and moved to a position above the branch instruction, the original meaning of the program is not changed. The instruction movement is also executed under the conditions such that the same instruction exists in each of the THEN part when the conditions are satisfied due to the comparing instruction of the IF part and the ELSE part when the conditions are not satisfied by the comparing instruction of the IF part and that even if the instructions are integrated and moved to the position where the THEN part and the ELSE part are merged, the original meaning of the program is not changed. After such an integrating process was executed as a preparation, the instructions are converted into the equivalent instruction sequence including no branch instruction by applying the steps 1 to 6.

According to such an instruction sequence optimizing method of the compiler of the invention, the instruction sequence including the branch instruction which is executed on the pipeline computer is converted into the equivalent instruction sequence including no branch instruction. That is, the comparison result indicating that the conditions are satisfied and there is no branch due to the execution of the comparing instruction or that the conditions are not satisfied and there is a branch is set into the general register as an effective coefficient or invalid coefficient. For example, the value "−1" in which all bits are equal to 1 is set into the general register as an effective coefficient, and the value "0" in which all bits are equal to 0 is set into the general register as an invalid coefficient. Subsequently, a difference between the execution result of the THEN part in case of no branch and the execution result in the case where the processing routine was branched and the instruction of the THEN part was skipped is obtained. Such a difference due to the presence or absence of the branch is used as an execution result of the comparing instruction and the AND is calculated between such a difference and the value which has already been stored in the general register, thereby deciding whether the difference due to the presence or absence of the branch is used or not. That is, in case of no branch, since the value of the general register is equal to the effective coefficient "−1", the value of the difference of the presence or absence of the branch is made effective as it is. On the contrary, when there is a branch, since the value of the general register is equal to the invalid coefficient "0", the value of the difference of the presence or absence of the branch is equal to 0 and is invalid. Finally, by adding the result of the AND, the value according to the presence or absence of the branch is obtained and the instruction after completion of the merging is executed.

Therefore, since the instruction sequence includes no branch instruction, the problem of the overhead when the branch conditions are satisfied in the case where the processes were executed on the assumption that "all branch instructions are not branched" can be solved. The number of instructions increases due to the conversion into the equivalent instruction sequence including no branch instruction. However, when the overhead when the branch conditions are satisfied is larger than the processing cycle of the increased number of instructions, an enough effect is obtained. In a parallel machine of the instruction level such as VLIW or superscalar, even when the number of instructions after the conversion increases, the number of cycles is not increased due to the parallel processes.

The above and other objects, features, and advantages of the present invention will become more apparent from the following detailed description with reference to the drawings.

BRIEF DESCRIPTION OF THE DRAWINGS

FIG. 1 is an explanatory diagram showing an example of a conventional IF–THEN type program;

FIG. 8 is an explanatory diagram showing an example of an IF~THEN type program as a conversion target;

FIG. 9 is an explanatory diagram showing the conversion result of FIG. 8 according to the invention;

FIG. 10 is an explanatory diagram showing another example of an IF~THEN type program as a conversion target;

FIG. 11 is an explanatory diagram showing the conversion result of FIG. 10 according to the invention;

FIG. 14 is an explanatory diagram showing an example of an IF~THEN type program as a conversion target including two loading instructions;

FIG. 15 is an explanatory diagram showing the conversion result of FIG. 14 according to the invention;

FIG. 17 is an explanatory diagram showing an example of an IF~THEN~ELSE type program as a conversion target;

FIG. 19 is an explanatory diagram showing the conversion result of FIG. 18 according to the invention.

DETAILED DESCRIPTION OF THE PREFERRED EMBODIMENTS

Figure 2:
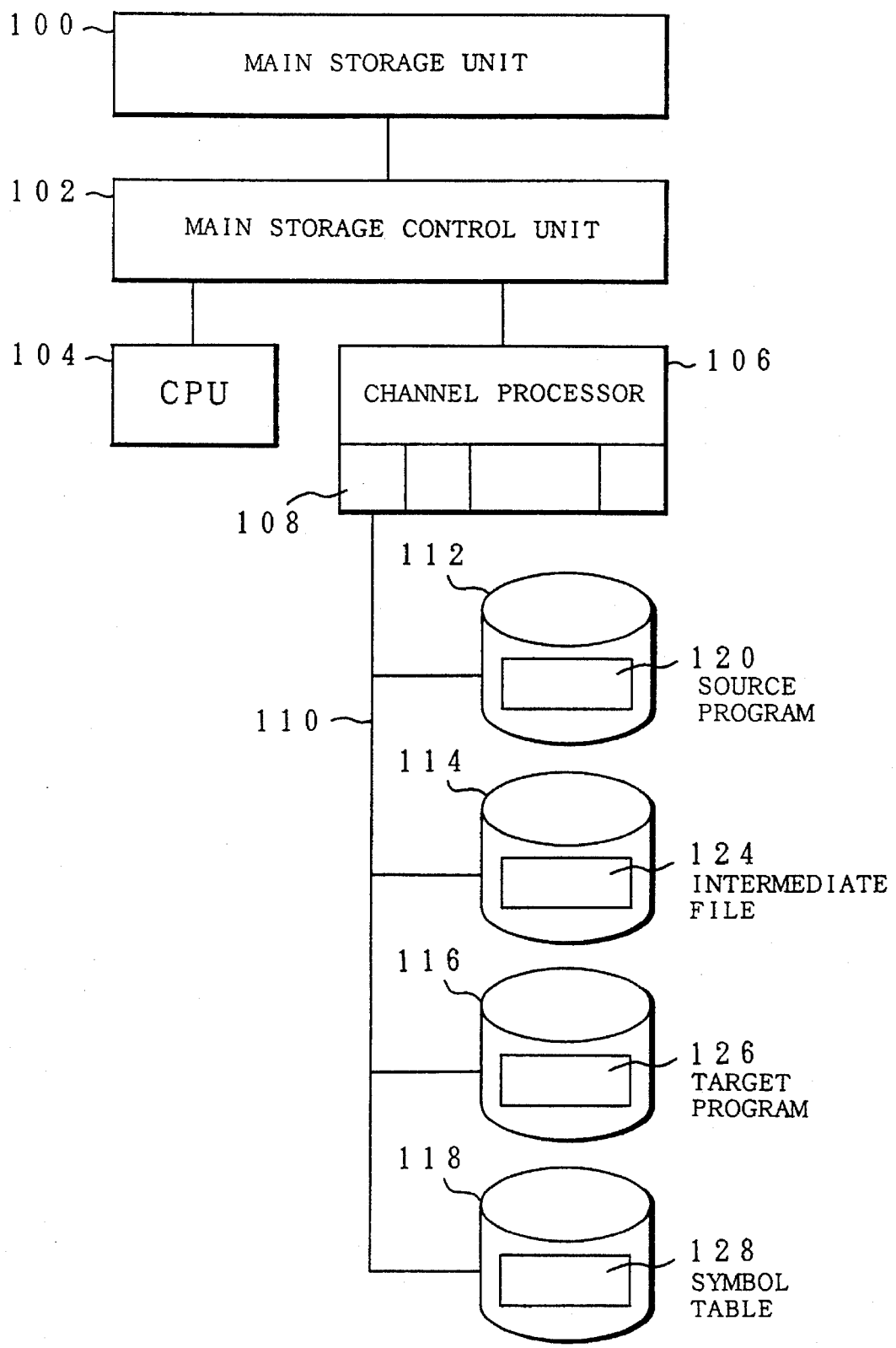
FIG. 2 is a block diagram of a computer hardware to which the invention is applied.

FIG. 2 shows an example of a hardware construction of a computer in which a compiler of the invention is realized. An operating system (OS) is stored in a main storage unit 100. A program to realize the compiler is developed when a power source is turned on. A main storage control unit 102 is provided for the main storage unit 100. A CPU 104 and a channel processor 106 are provided for the main storage control unit 102. The CPU 104 executes a compilation to convert a source program into a target program in accordance with the program developed in the main storage unit 100. File apparatuses 112, 114, 116, and 118 using magnetic disk units or the like are connected to a channel apparatus 108 of the channel processor 106 through a channel bus 110. A source program 120 to execute the compilation has been stored in the file apparatus 112. An intermediate file 122 which is produced every processing step of the compilation has been stored in a file apparatus 124. A target program 126 after completion of the compilation has been stored in the file apparatus 124. A symbol table 128 which is produced in the processing step of the compilation has been stored in the file apparatus 118. The other apparatuses such as CRT, printer, keyboard, and the like are connected to the other channels of the channel processor 106.

Figure 3:
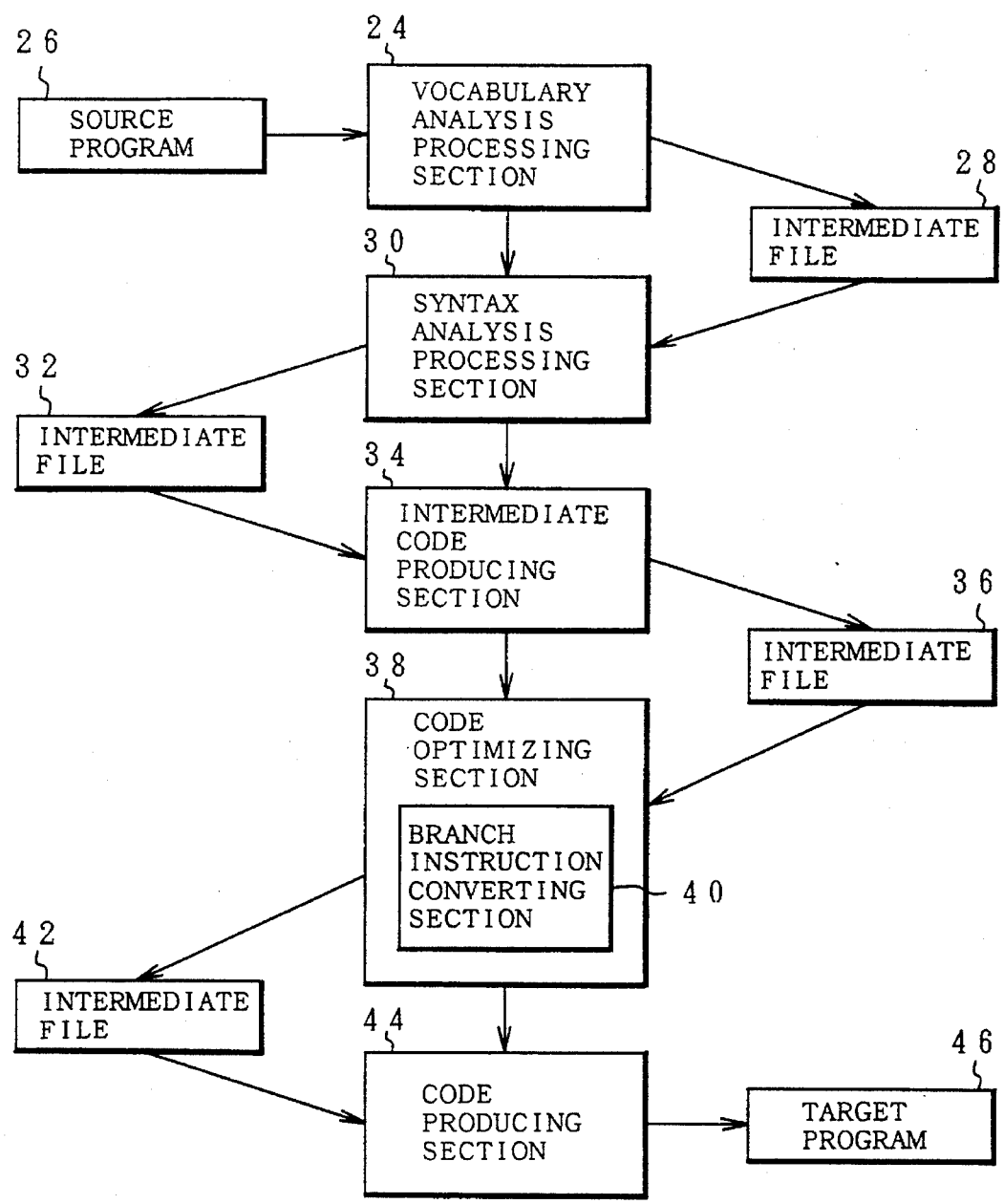
FIG. 3 is a block diagram showing a function construction as a compiler.

FIG. 3 shows functions of the compiler which is realized by the execution of the program by the CPU 104 in FIG. 2. The compiler comprises a vocabulary analysis processing section 24, a syntax analysis processing section 30, an intermediate code producing section 34, a code optimizing section 38, and a code producing section 44. A source program 26 is input to the vocabulary analysis processing section 24. Intermediate files 28, 32, 36, and 42 are produced in the vocabulary analysis processing section 24, syntax analysis processing section 30, intermediate code producing section 34, and code optimizing section 38, respectively. A branch instruction converting section 40 of the invention for converting a program portion including branch instructions into an equivalent program including no branch instruction is provided for the code optimizing section 38. The code producing section 44 generates a target program 46 after completion of the compilation.

Figure 4:
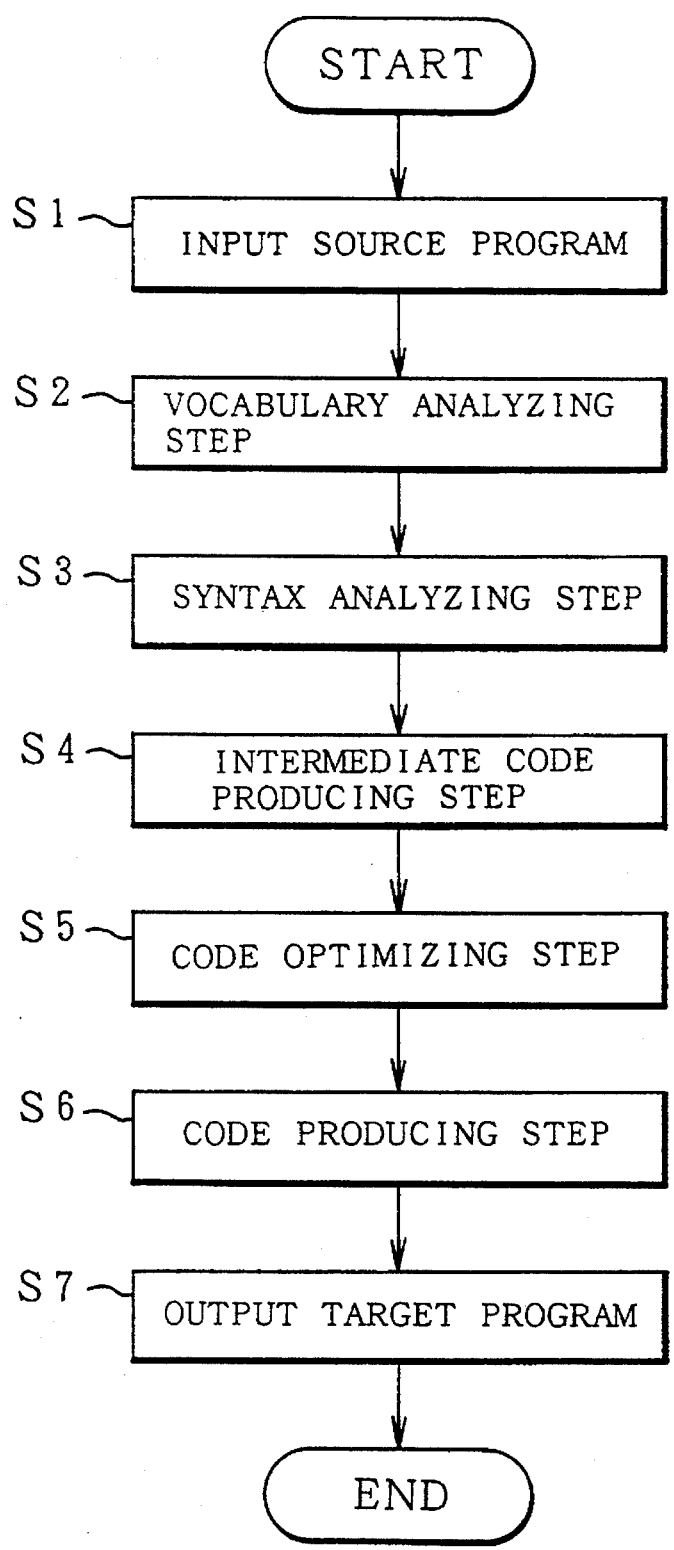
FIG. 4 is a flowchart showing a processing procedure of a compiler to which the invention is applied.

A flowchart of FIG. 4 shows the processing operation in the compiler in FIG. 3. In a source program inputting step S1, the source program 26 written by a predetermined programming language such as an FORTRAN or the like is input to the vocabulary analysis processing section 24. In a vocabulary analyzing step S2, the vocabulary of the programming language of the source program which was input in step S1 is analyzed in the vocabulary analysis processing section 24. That is, the source program 26 written by the programming language is divided every word called a "token" and a validity of the word is checked. There are a keyword, an operator, a variable name, a constant, a delimiter, and the like as typical examples of the token. In the vocabulary analysis processing section 24, after the validities of all of the vocabularies of all of the source programs 26 were checked, the intermediate file 28 comprising a set of tokens is generated and the processing routine advances to the next syntax analyzing step S3. In the syntax analyzing step S3, the syntax analysis processing section 30 inputs the intermediate file 28 which was generated in the vocabulary analyzing step S2 and a check is made to see if it coincides with a grammatical rule of the programming language in which the source program 26 is used or not. If YES, a procedure to execute the source program 26 is decided and is similarly generated as an intermediate file 32. The syntax analysis by the syntax analysis processing section 30 generally has two functions. One of them is a function to discriminate whether each token on the source program 26 exists at a grammatically correct position or not. The other is a function such that after the existence meanings of all tokens on the source program 26 were analyzed, their executing procedures are determined and such procedures are expressed as a flow of tokens or a group. In general, a tree structure (parser tree) is used to express the analysis results of the executing orders of the tokens. In the intermediate code producing step S4, a tree structure (parser tree) of the intermediate file 32 formed in the syntax analyzing step S3 is input to the intermediate code producing section 34 and is converted into the inherent intermediate code which the compiler has and the intermediate file 36 is generated. A 3-operand system is known as a typical intermediate code.

In the next code optimizing step S5, the intermediate code of the intermediate file 36 obtained in step S4 is input to the code optimizing section 38 and is converted into the intermediate language which can be executed with a smallest capacity and at a highest speed on the pipeline computer as a target and the intermediate file 42 is generated. As a general optimizing method, there is a local optimization, an optimization of the loop, or the like. The local optimization denotes that surplus instructions are reduced. The optimization of the loop relates to a method such that in the case where there is an expression indicative of the same value each time the loop is executed, it is unconditionally thrown out of the loop and the loop is executed only at the first time. According to the invention, in the code optimizing step, since the branch instruction converting section 40 reduces the overhead of the branch instruction on the pipeline computer, the optimizing process for detecting the instruction sequence including the branch instructions and for converting into the equivalent instruction sequence including no branch instruction is executed.

In the next code producing step S6, the intermediate code or intermediate language of the intermediate file 42 after completion of the code optimization is input to the code producing section 44 and is converted into, for example, a instruction set of the pipeline computer as a target. The last step S7 to output a target program relates to a process for outputting the target program 46 which was converted into the assembly language or machine language which can be executed by the computer as a target through the processes in steps S1 to S6 into an ROM or program file of the target computer.

The symbol table 128 stored in the file apparatus 118 in FIG. 2 is formed through all of the processing steps of the compiler and is used to refer to the necessary portion in the whole source program. That is, as for the symbol table 128, the transfer of the information in the source program and the check of the meanings in the above processing steps are all executed through the symbol table 128.

Figure 5:
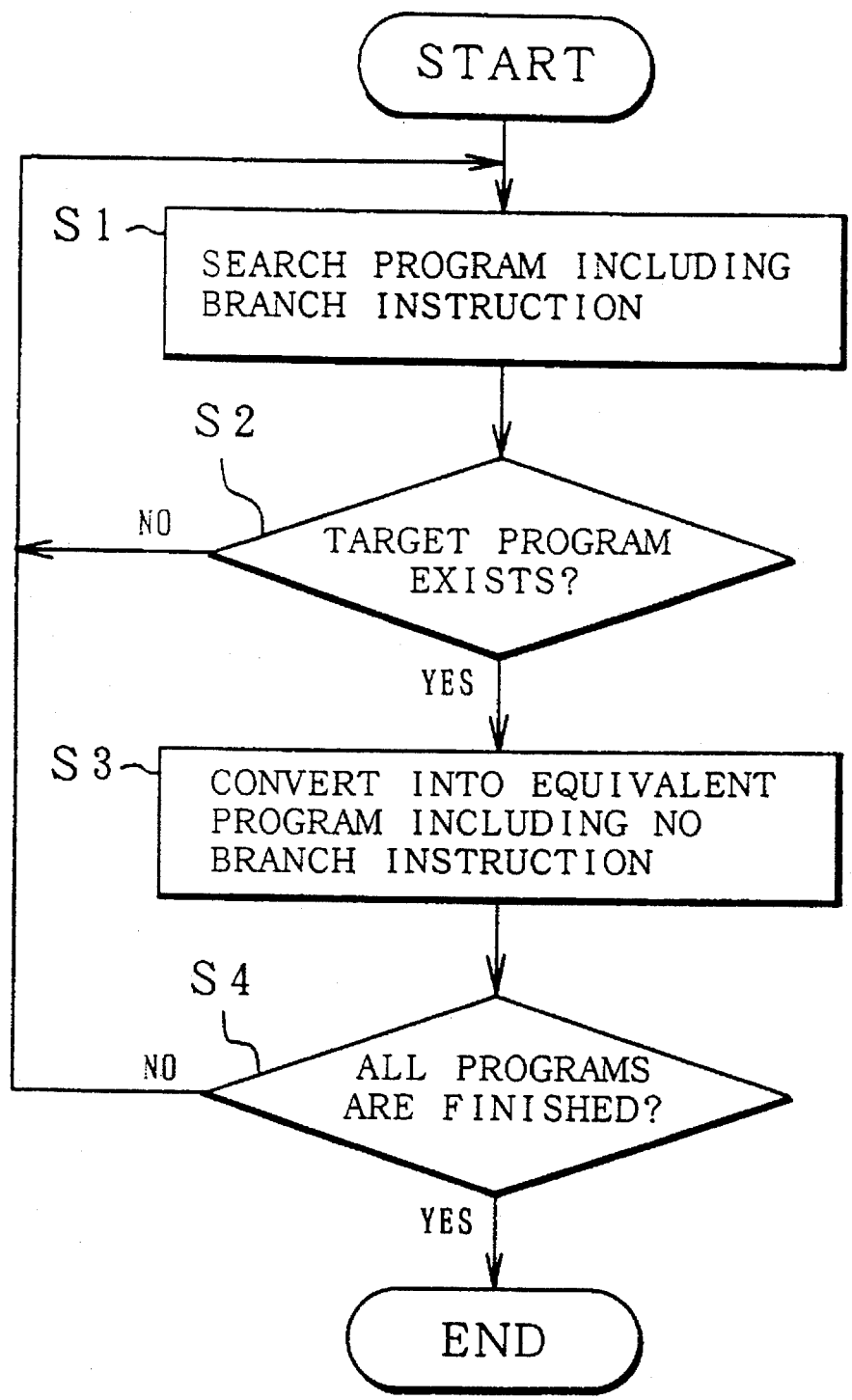
FIG. 5 is a flowchart showing an outline of a converting process of the invention.

A flowchart of FIG. 5 shows processes of the branch instruction converting section 40 provided in the code optimizing section 38 in FIG. 3. The converting process of the branch instruction searches for the instruction sequence including the branch instructions, namely, the program portion in step S1. As a program portion including the branch instructions as a search target in step S1, there are two portions: a program portion of the IF~THEN type and a program portion of the IF~THEN~ELSE type. When the search of the target program is judged in step S2, step S3 follows and the program is converted into the equivalent program including no branch instruction. The above processes in steps S1 to S3 are repeated until the processes of all of the programs are finished in step S4.

Figure 6:
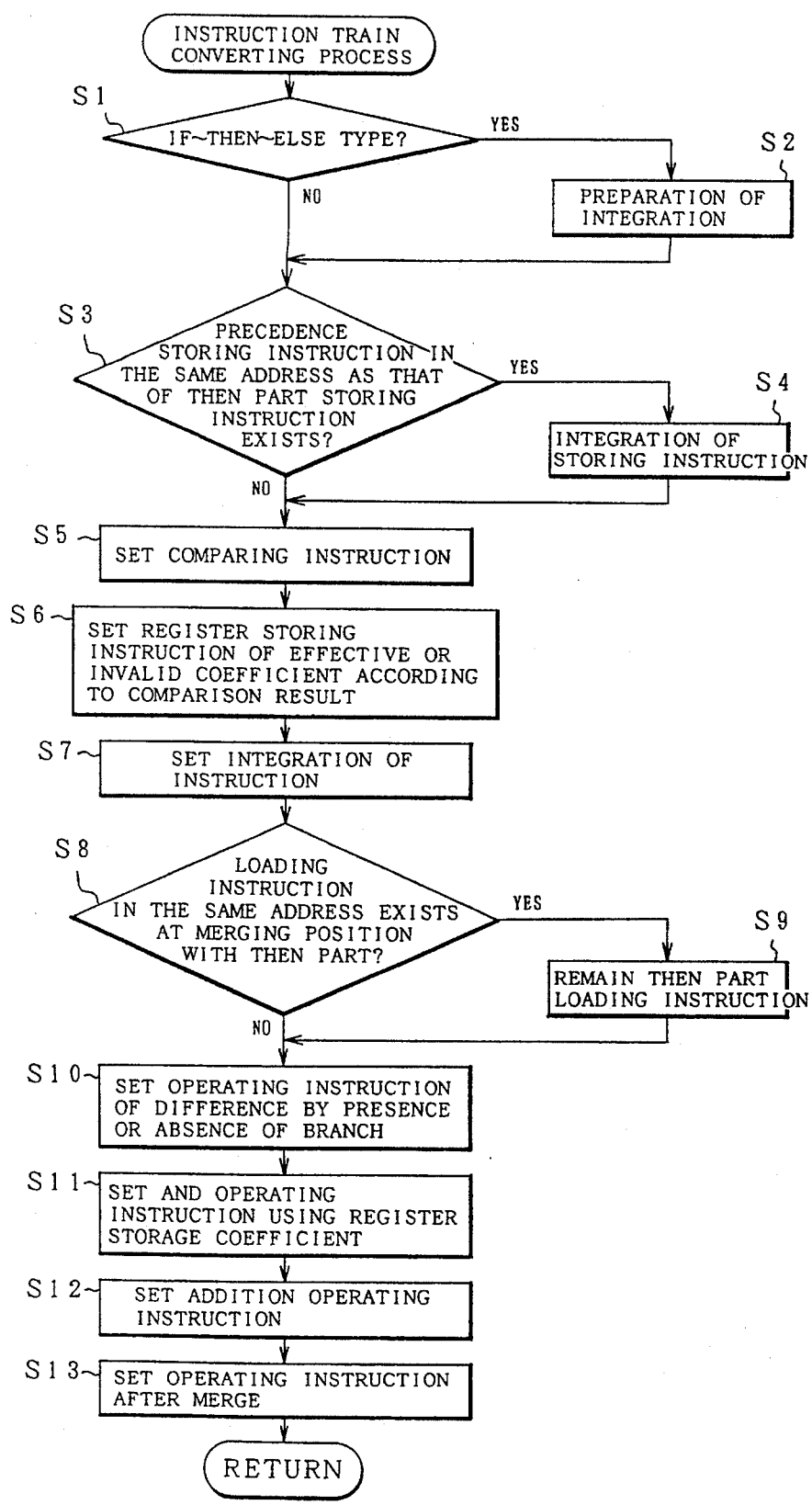
FIG. 6 is a flowchart showing the details of the converting process of the invention.

A flowchart of FIG. 6 shows the details of the instruction sequence converting process shown in step S3 in FIG. 5. First, in step S1, a check is made to see if the program as a conversion target is of the IF~THEN~ELSE type or not. If YES, step S2 follows and a preparation to integrate the overlapped instruction portions is executed. Such a preparation will be clearly explained hereinlater. In case of the program of the IF~THEN type, the processing routine advances to step S3 without executing the process in step S2. In step S3, in the case where the precedence storing instruction of the same address as that of the storing instruction of the THEN part exists in the program, step S4 follows and the storing instructions are integrated. The integration of the storing instructions will be also clearly explained hereinlater. In steps S5 to S13, the program including the branch instructions is converted into the equivalent program including no branch instruction. Among those steps, steps S8 and S9 relate to processes such that the instructions which don't exert any side effect even when the processing routine was branched among the instructions of the THEN part in case of no branch are left as they are, so that those processes are optional processes. Such processes of the loading instructions will be also clearly explained hereinlater. Therefore, the processes in steps S5 to S13 excluding steps S8 and S9 become the substantial instruction sequence converting process. The converting process in steps S5 to S13 will now be described hereinbelow with reference to FIGS. 7A and 7B.

Figure 7A:
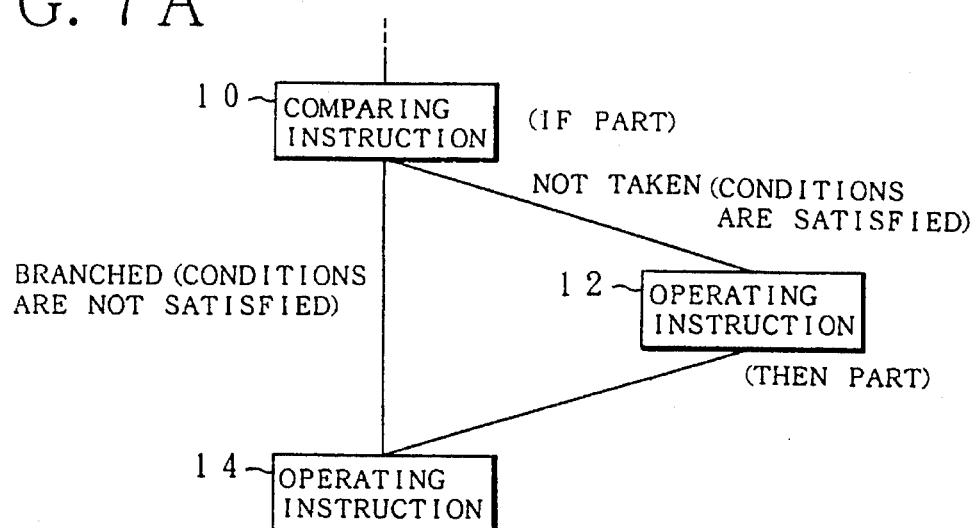
FIGS. 7A and 7B are explanatory diagrams showing a conversion structure from an IF~THEN type instruction according to the invention.

FIG. 7A shows a structure of a program of the IF~THEN type as a fundamental of a target to be converted of the invention. First, a comparing instruction 10 is set in an IF part of the head portion. When conditions are satisfied by executing the comparing instruction 10, there is no branch. An operating instruction 12 of a THEN part is executed and, subsequently, an operating instruction 14 is executed. On the other hand, when the conditions are not satisfied by executing the comparing instruction 10, the operating instruction 12 of the THEN part is skipped by the execution of a branch instruction and the operating instruction 14 existing at a merging position after the branch is immediately executed.

Figure 7B:
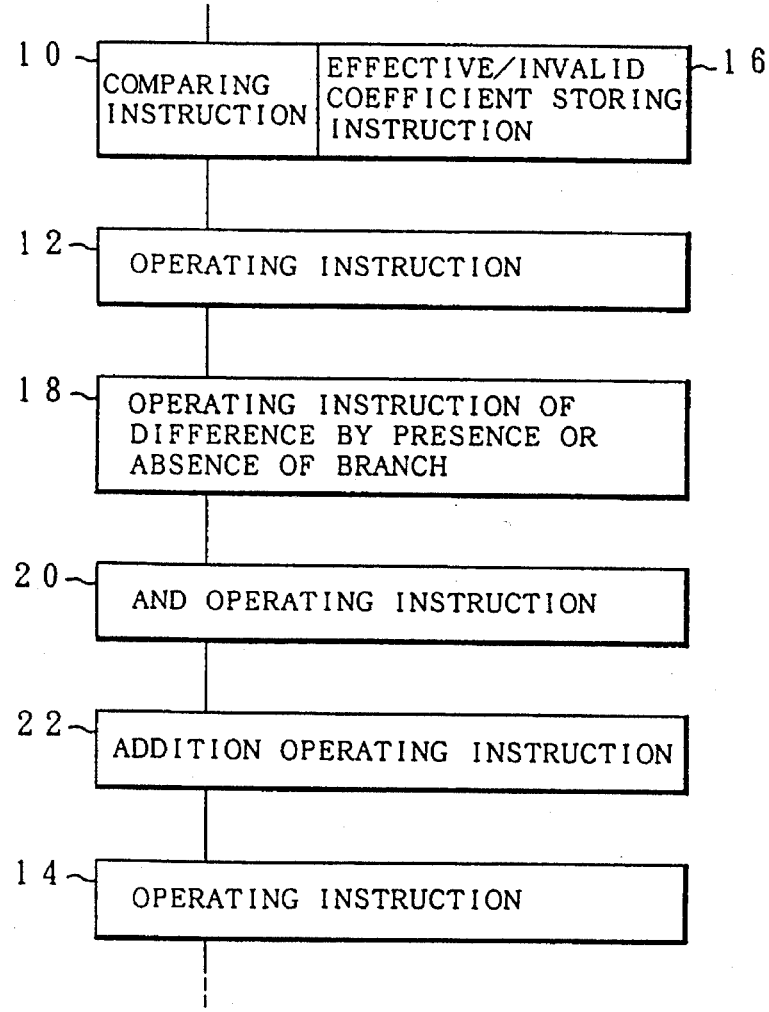

Such a program including the branch instruction as shown in FIG. 7A is converted into an equivalent program including no branch instruction shown in FIG. 7B by processes in steps S5 to S13 shown in FIG. 6. First, in step S5, the comparing instruction 10 is arranged as it is. In step S6, when the conditions are satisfied by executing the comparing instruction 10 and there is no branch (also referred to as "not taken"), effective coefficients are stored into a predetermined general register. On the other hand, a register storing instruction 16 of effective/invalid coefficients for storing invalid coefficients when the conditions are not satisfied by the execution of the comparing instruction 10 and there is a branch (also referred to as "taken") into the same general register is formed and arranged. As an effective coefficient which is used in the register storing instruction 16 of the effective/invalid coefficients, the value "–1" in which all bits are equal to 1 is used. On the other hand, as an invalid coefficient, the value "0" in which all bits are equal to 0 is used. In subsequent step S7, the comparing instruction 10 and the register storing instruction 16 of the effective/invalid coefficients are arranged as one set of instructions. That is, a pipeline computer can execute instructions at levels like the register storing instruction 16 of the effective/invalid coefficients to set a value to the general register in addition to the comparing instruction 10 by one cycle even if the computer is not a parallel machine at an instruction level such as VLIW or superscalar. Subsequently, the operating instruction 12 which has been set in the THEN part is set as it is. An operating instruction 18 of a difference by the presence or absence of branch is set in step S10. The operating instruction 18 of the difference by the presence or absence of branch is set to a value that is obtained by subtracting the value obtained by executing only the operating instruction 14 when there is a branch in FIG. 7A from the value obtained by executing the operating instructions 12 and 14 when there is no branch in FIG. 7A. In step S11, an AND operating instruction 20 is set. The AND operating instruction 20 is an instruction to obtain the AND between the contents of the general register which was set in the beginning by the register storing instruction 16 of the effective/invalid coefficients and the value of the difference due to the presence or absence of branch obtained by the operating instruction 18 of the difference by the presence or absence of branch.

That is, the value obtained by executing the operating instructions 12 and 14 when there is no branch in FIG. 7A is larger than the value obtained by executing only the operating instruction 14 when there is a branch by an amount of only the value of the difference obtained by the operating instruction 18 of the difference by the presence or absence of branch in FIG. 7B. In order to make the difference effective, by obtaining the AND with the effective coefficient "−1" stored in the general register by the storing instruction 16 of effective/invalid coefficients, namely, the AND with all bits which are equal to 1, the value itself of the difference due to the presence or absence of branch is set to the result of the AND operation. On the other hand, when there is a branch, the invalid coefficient "0" has been stored in the general register. When the AND between the invalid coefficient "0" and the difference value by the presence or absence of the branch is calculated, the difference of the AND due to the presence or absence of branch is extinguished.

In step S12, an addition operating instruction 22 is set. The addition operating instruction 22 is an instruction to add the arithmetic operational result by the AND operating instruction 20 to the value of the register which is used by the operating instruction 14 of the merging position. That is, in case of no branch, since the operational result by the AND operating instruction 20 is equal to the value itself of the difference by the presence and absence of the branch, the difference is added. On the other hand, when there is a branch, since the operational result by the AND operating instruction 20 is equal to 0, 0 is added by the addition operating instruction 22 and the value is not changed. Finally, in step S13, the operating instruction 14 by the merge after completion of the discrimination about the presence or absence of the branch in FIG. 7A is set.

As mentioned above, the program including the branch instruction shown in FIG. 7A can be converted to the equivalent program including no branch instruction shown in FIG. 7B. In this case, the number of instructions in the program after the conversion in FIG. 7B increases as compared with that before the conversion in FIG. 7A. However, an architecture of a machine which is a target of the compiler to which the invention is applied, that is, a parallel degree or an overhead of the branch is considered and, it is sufficient to execute an optimizing process such as to make the conversion according to the invention effective in the case where the instruction cycle which was increased by the conversion is smaller than the overhead at the time of branching.

The conversion of the program according to the invention will now be specifically explained. FIG. 8 shows an example of a program of the IF~THEN type to which the conversion of the invention is applied. The program is described by the assembly language and a processing route showing an equational expression, contents, and further, a processing procedure is also added for convenience of explanation.

In FIG. 8, the instruction "cmp" in step S1 checks to see if the value of the register r3 is equal to or larger than 0. When the content of the register r3 is equal to or larger than 0, there is no branch. If NO, namely, when the value is less than 0, there is a branch. The operating instruction "add" in the following step S2 inputs the value obtained by adding the contents of registers r10 and r11 into a register r1. Subsequently, the instruction "ble L1" indicative of the branch destination is provided. And an "nop" indicative of emptiness is provided. In case of the pipeline computer to execute the program converted by the compiler of the invention, there are four pipeline stages of the fetch stage F, first execution stage E1, second execution stage E2, and write stage W. According to a structure of the pipeline, with respect to the branch instruction "ble L1", the next operating instruction is first executed before the "ble L1". In the case where it is wrong to first execute the instruction subsequent to the branch instruction, the "nop" indicative the emptiness is preliminarily set.

The operating instruction "add" in step S3 as a THEN part is set. The operating instruction "add" inputs the value which is obtained by adding the contents of registers r12 and r13 into the register r1. Subsequent to a label L1 indicative of the branch destination, the operating instruction "add" in step S4 is now set. The operating instruction "add" inputs the value obtained by adding the contents of registers r1 and r5 into a register r2. Such an IF~THEN type program before conversion according to the invention executes the operating instructions in steps S3 and S4 when there is no branch and only the operating instruction in step S4 when there is a branch as shown in the processing route.

FIG. 9 shows the conversion result of the invention of the IF~THEN type program in FIG. 8 as a target. First, a comparing instruction "cmp" in step S1 checks to see if the content of the register r3 is equal to or larger than 0. In accordance with the comparison result, the effective coefficient "−1" or invalid coefficient "0" is set to a predetermined general register r7. That is, when the value of the register r3 is equal to or larger than 0 and the comparison condition is satisfied, the effective coefficient "−1" is input to the general register r7. On the other hand, when the value of the register r3 is less than 0 and the comparison condition is not satisfied, the invalid coefficient "0" is input to the general register r7. The operating instruction "add" in the following step S2 inputs the value obtained by adding the contents of the registers r10 and r11 into the register r1.

The operating instructions "add" in steps S3 and S4 are operating instructions to obtain the difference due to the presence or absence of branch. The operating instruction "add" instep S3 executes an operation in the operating instruction "add" in step S3 in the case of no branch shown in FIG. 8 by using a register r8. That is, the value obtained by adding the contents of the registers r12 and r13 is input into the register r8. A subtracting instruction "sub" in step S4 obtains the value of the difference due to the presence or absence of branch by subtracting the value of the register r1 in the operating instruction "add" in step S4 when there is a branch in FIG. 8 from the value of the register r8 which was obtained by the adding instruction "add" in step S3 in FIG. 9.

An operating instruction "and" in step S5 is an AND operating instruction. The AND operating instruction "and" obtains the AND between the effective or invalid coefficient which has been stored in the general register r7 at the time of execution of the comparing instruction "cmp" in step S1 and the value of the difference due to the presence or absence of branch obtained by the subtracting instruction "sub" in step 4, namely the value of the register r8, and the AND obtained is stored into the register r8. In this instance, when the content of the general register r7 is equal to the effective coefficient "−1" due to no branch, the value of the difference due to the presence or absence of branch of the register r8 which was obtained by the subtracting instruction "sub" in step S4 is effective. On the other hand, in the case where there is a branch and the content of the general register r7 is equal to the invalid coefficient "0", the value of the difference due to the presence or absence of branch of the register r8 which was obtained by the subtracting instruction "sub" in step S3 is equal to 0, so that the value is invalid.

The operating instruction "add" in step S6 is an adding operating instruction to add the value of the register r8 having the result of the AND obtained by the AND instruction "and" in step S5 to the value of the register r1 which is used in this operating instruction. Finally, the operating instruction "add" in step S7 is set. The operating instruction "add" is the same as that in step S4 existing at the merging position shown in FIG. 8. As mentioned above, the program including the branch instruction in FIG. 8 can be converted to the equivalent program having no branch instruction as shown in FIG. 9.

The program including the branch instruction in FIG. 8 has six cycles when there is no branch and [five+α] cycles when there is a branch. The α cycles correspond to an amount of the overhead due to the branch. On the other hand, the program as shown in FIG. 9 after conversion according to the invention has seven cycles. When three cycles of the increase amount are less than the α cycles of the overhead amount, the overhead due to the branch instruction can be reduced.

FIG. 10 shows another example of the IF~THEN type program as a conversion target of the invention. FIG. 11 shows the result of the conversion to the equivalent program including no branch instruction of the invention. In this case, the conversion according to FIGS. 7A and 7B is also basically executed. The program before conversion in FIG. 10 has six cycles when there is no branch and [five+α] cycles (the α cycles correspond to an overhead due to the branch) when there is a branch. On the other hand, the program after the conversion in FIG. 11 has only five cycles. An executing efficiency can be raised by the conversion according to the invention.

Figure 12:
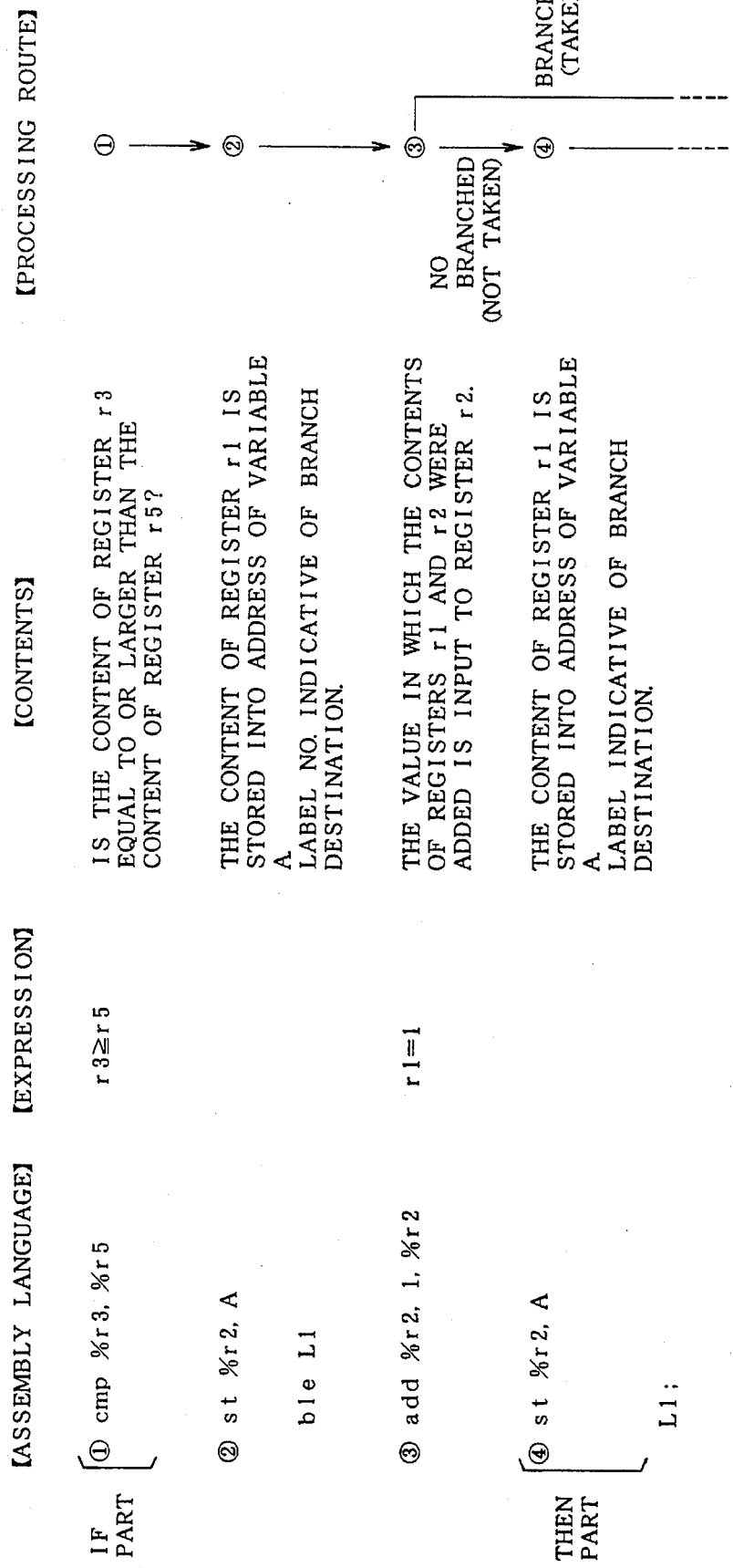
FIG. 12 is an explanatory diagram showing an example of an IF~THEN type program as a conversion target including two storing instructions.

FIG. 12 shows another example of the program including the branch instruction as a conversion target of the invention. This program relates to the case where storing instructions for the same address exist before and after the branch instruction and the processes in steps S3 and S4 in FIG. 6 are added. In the program before conversion in FIG. 12, after the comparing instruction "cmp" in step S1, there is a storing instruction "st" in step S2, and subsequent to the branch instruction "ble L1", the operating instruction "add" in step S3 and the storing instruction "st" in step S4 are provided in the THEN part. The storing instruction "st" in step S2 before the branch and the storing instruction "st" in step S4 in the THEN part after the branch store the value of the register r2 into the same address of a variable A. When the optimizing method of the invention is applied to such an IF~THEN type program having the storing instructions for the same address before and after the branch instruction as shown in FIG. 12 and the program is converted, the program after the conversion is as shown in FIG. 13.

Figure 13:
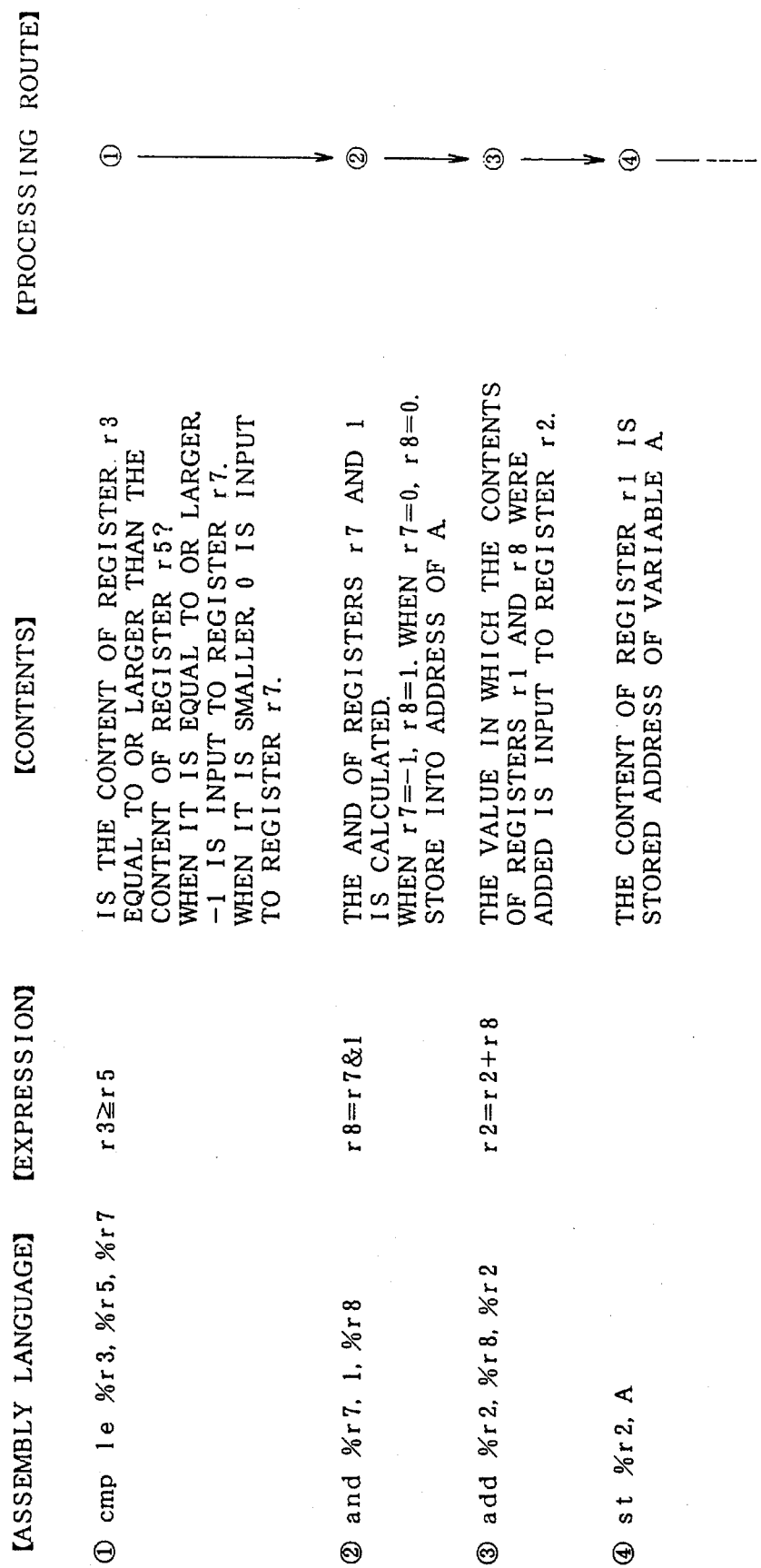
FIG. 13 is an explanatory diagram showing the conversion result of FIG. 12 according to the invention.

According to the conversion result in FIG. 13, the two storing instructions "st" in steps S2 and S4 of the program before conversion in FIG. 11 can be integrated to one storing instruction "st" in subsequent step S4. As a result, in the program before conversion in FIG. 12, when there is no branch as shown in the processing route, it is necessary to store twice into the same address. In the program after conversion shown in FIG. 13, however, it is sufficient to store only once as shown in the storing instruction "st" in step S4.

FIG. 14 shows another example of the IF~THEN type program to which the invention is applied. The processes in steps S8 and S9 in FIG. 6 are added as for the above program. In the program before conversion in FIG. 14, when there is no branch in step S1, a register g2 defined by a loading instruction "ld" in the THEN part in steps S2 and S3 is again defined by the loading instruction "ld" in the following step S4. Due to this, the value of the register g2 which is defined by the loading instruction "ld" in step S2 is effective only for the operating instructions "ld" and "add" in the THEN part as steps S2 and S3. Therefore, with respect to the value of the register g2, it is sufficient to consider only the case of no branch and to use the operating instruction "ld" in step S2 as it is even after the conversion.

Namely, as shown in FIG. 15, the loading instruction "ld" which is the same as that in step S2 in FIG. 14 and is effective only when there is no branch is set as it is in step S2 subsequent to the comparing instruction "cmp" in step S1. The operating instructions "add", "sub", and "and" in steps S3 to S6 have conversion formats of the operating instruction of the difference due to the presence or absence of the branch, AND operating instruction, and adding operating instruction according to the conversion rule shown in FIG. 7B.

Figure 16:
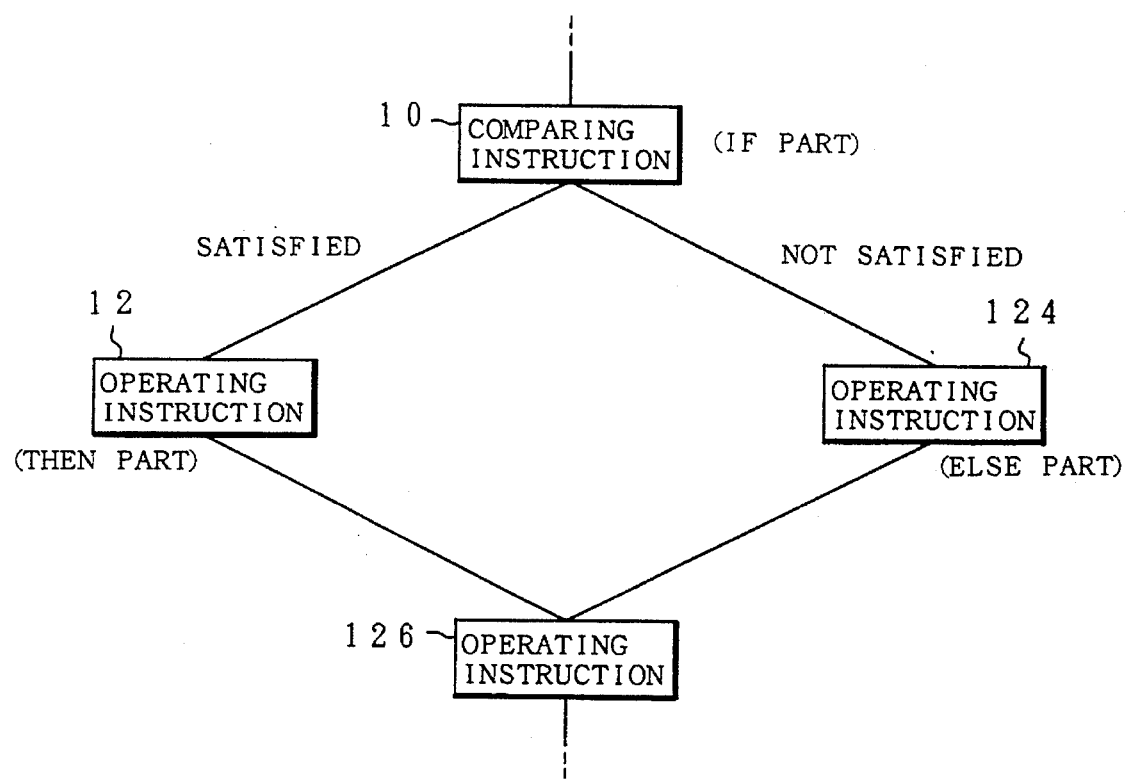
FIG. 16 is an explanatory diagram of a structure of an IF~THEN~ELSE type program as a conversion target.

FIG. 16 shows a structure of an IF~THEN~ELSE type program to which the converting method of the invention is applied. According to an instruction structure of the IF~THEN~ELSE type program in FIG. 16, the operating instruction 12 of the THEN part is executed when the conditions are satisfied by the comparing instruction 10. The operating instruction 126 follows. On the other hand, when the conditions are not satisfied, after the operating instruction 124 in the ELSE part was executed, the operating instruction 126 is executed. When the converting method of the invention is applied to such an instruction sequence of the IF~THEN~ELSE type program, although the operation contents of the difference in the cases where the comparison conditions are satisfied and where they are not satisfied differ from those of the IF~THEN type program in FIG. 7A, the fundamental conversion formats are substantially equal. Namely, a preparation of an integration shown in step S2 in FIG. 6 is added. The preparation of the integration will now be explained hereinbelow.

When loading instructions for the same register and storing instructions for the same address individually exist in the THEN and ELSE parts, respectively, according to the conversion of the invention, two loading instructions can be integrated into one loading instruction and two storing instructions can be integrated into one storing instruction. FIG. 17 shows an example of the "IF~THEN ELSE" type program shown in FIG. 16. Subsequent to the comparing instruction "cmp" in the IF part in step S1, the loading instruction "ld" and adding instruction "add" serving as THEN part in steps S2 and S3 are set. In this instance, a branch instruction "b L4" has been set between the loading instruction "ld" in step S2 and the adding instruction "add" in step S3. In the pipeline computer, however, according to the structure, the instructions are sequentially executed in accordance with the order of the loading instruction "ld", adding instruction "add", and branch instruction "b L4".

On the other hand, the loading instruction "ld" and adding instruction "add" are set in the ELSE part in steps S4 and S5. The loading instruction "ld" in step S4 is a instruction to load a constant (a) to the register g2 and is a instruction for loading to the same register g2 as that of the loading instruction "ld" provided in the THEN part in step S2. When the loading instruction "ld" for the register g2 in the THEN part in step S2 and the loading instruction "ld" for the same register g2 in the ELSE part in step S4 exist, the two loading instructions in steps S2 and S4 can be integrated into one loading instruction "ld" in the conversion to the equivalent program including no branch instruction of the invention.

Figure 18:
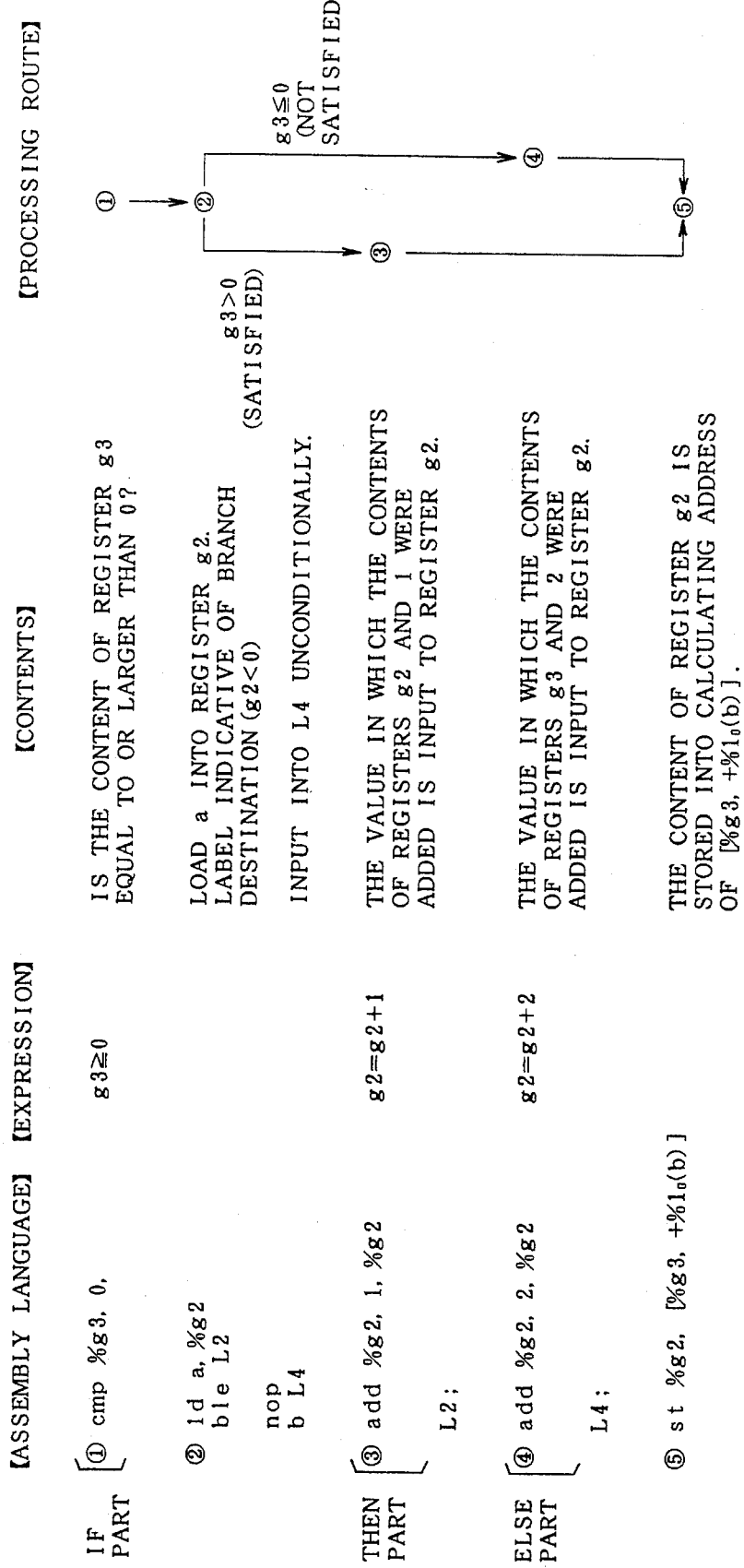
FIG. 18 is an explanatory diagram showing an integration preparation of two loading instructions in FIG. 17 according to the invention.

FIG. 18 shows the result of the preparation in which the loading instructions "ld" in steps S2 and S4 shown in FIG. 17 were integrated. According to a specific integrating method, in FIG. 17, the instructions are sequentially compared in accordance with the order from the head instructions in the THEN and ELSE parts to the lower instructions.

When there are same instructions, as shown in FIG. 18, if one of the instructions can be moved to a position above the branch instruction "ble L2", it is moved. As for the instructions which are moved in this instance, the instructions depending on the branch instruction are excluded. If there is no same instruction, the processing routine is finished. In case of FIG. 17, since the loading instruction "ld" which coincides with the loading instruction "ld" existing in step S2 in the THEN part exists in step S4 in the ELSE part, as shown in FIG. 18, the loading instruction in the ELSE part is moved to the portion in step S2 above the branch instruction "ble L2". As shown in the processing route in FIG. 18, the number of instructions can be consequently reduced by the integration of the loading instructions. Subsequently, the instructions are sequentially compared in accordance with the order from the last instructions to the upper instructions in the THEN and ELSE parts in FIG. 17. When there are same instructions and they can be moved, one of the instructions is moved below a label L4. The instructions depending on the branch instruction are also excluded from the moving targets in this case. If there is no same instruction, the processing routine is finished there. In case of FIG. 17, since there is no instruction which coincides with the instructions compared from the bottom, this means that the conversion is not executed.

When the preparation to reduce the number of instructions shown in FIGS. 17 and 18 is finished as mentioned above, the converting process to the equivalent program having no branch instruction according to the invention as shown in FIGS. 7A and 7B is applied to the program in FIG. 18 and the conversion result shown in FIG. 19 can be obtained.

As mentioned above, according to the invention, by converting the instruction sequence including the branch instructions to the equivalent instruction sequence including no branch instruction, the overhead which occurred by the execution of the branch instruction in the pipeline computer can be reduced, the optimizing process of codes in the compiler is further raised, and the processing performance of the pipeline computer can be brought out.

Although the above embodiments have been described with respect to the example of the conversion to the program which is executed by the pipeline computer of four stages, similar results can be also obtained when the invention is applied to a machine which is known as a VLIW which can execute a plurality of instructions in parallel as one word or a machine which is known as a superscalar which discriminates instructions which can be dynamically executed in parallel and processes them in parallel.

Especially in the present invention, the number of instructions of the program after the conversion increases. In the VLIW or superscalar, however, even when the number of instructions increases, the number of executing cycles doesn't increase. Therefore the invention is more effective.

The invention is not limited to the conversion into the program including the branch instructions shown in the embodiments but can be applied as it is to the conversion into the program including proper branch instructions.

Although the programs have been expressed by the assembly language for convenience of explanation in the above embodiments, the invention is not limited by the assembly language.

What is claimed is:

1. A method of optimizing an instruction sequence of a compiler, comprising:

a detecting step of detecting an instruction sequence including branch instructions from among instruction sequences which are obtained by converting an instruction sequence of a source program so that said instruction sequences can be executed by a pipeline computer; and a converting step of converting said instruction sequence including the branch instructions detected in said detecting step into an equivalent instruction sequence including no branch instruction, wherein in the case where an instruction sequence of the IF–THEN type is detected in said detecting step, said converting step comprises:

a first step of arranging a comparing instruction of the IF part of the instruction sequence of said IF–THEN part;

a second step of forming and arranging a register storing instruction for storing an effective coefficient into a value of a predetermined general register in the case where there is no branch when comparison conditions due to the execution of said comparing instruction are satisfied and for storing an invalid coefficient into the value of said general register in the case where there is a branch when the comparison conditions are not satisfied;

a third step of forming and arranging an operating instruction to obtain a difference between a value which is obtained in the case where the instruction of the THEN part was executed because there is no branch due to the execution of the comparing instruction and a value which is obtained in the case where the instruction of the THEN part was skipped by the branch instruction because there is a branch;

a fourth step of forming and arranging an AND calculating instruction for calculating the AND of the value which is obtained by executing the operating instruction of the difference due to the presence or absence of the branch in said third step and said effective coefficient or invalid coefficient which has been stored in said general register by said arranging instruction in said second step;

a fifth step of forming and arranging an adding instruction for adding the value which is obtained by the execution of said AND calculating instruction which was formed and arranged in said fourth step into a value that is used by an instruction of a merging destination; and a sixth step of arranging the operating instruction at a merging position as it is.

2. A method according to claim 1, wherein said comparing instruction which is arranged in said first step and said register storing instruction of said effective coefficient or said invalid coefficient which is arranged in said second step are integrated and arranged as an instruction that is executed in one cycle.

3. A method according to claim 1, wherein said register storing instruction which is formed and arranged in said second step is an instruction to store a numerical value —1 such that all bits are equal to 1 into said general register as an effective coefficient.

4. A method according to claim 1, wherein said register storing instruction which is formed and arranged in said second step is an instruction to store a numerical value 0 such that all bits are equal to 0 into said general register as an invalid coefficient.

5. A method according to claim 1, wherein in said converting step, in the case where the storing instruction having the same address exists at an instruction position subsequent to said branch instruction of the IF part and in said THEN part, said storing instruction is integrated to a precedent storing instruction and, after that, the instruction sequence having the branch instructions is converted into an equivalent instruction including no branch instruction by applying said first to sixth steps.

6. A method according to claim 1, wherein in said converting step, among the instructions of the THEN part in case of no branch, the instructions which don't exert any side effect even if the instruction was branched are left as they are and, in this state, the instruction sequence including the branch instructions is converted into an equivalent instruction sequence including no branch instruction by applying said first to sixth steps.

7. A method according to claim 1, wherein in said converting step, in the case where an instruction sequence of the IF~THEN~ELSE type is detected in said detecting step, an instruction movement is performed under conditions such that substantially the same instruction exists in each of the THEN part when the conditions of the comparing instruction of the IF part are satisfied and the ELSE part when the conditions of the comparing instruction of the IF part are not satisfied and that, even if the instructions are integrated and moved to a position above the branch instruction, an original meaning of the program is not changed, and by applying said first to sixth steps to the instruction sequence which was subjected to said integrating process, the instruction sequence including the branch instructions is converted into an equivalent instruction sequence including no branch institution.

8. A method according to claim 1, wherein in said converting step, in the case where an instruction sequence of the IF~THEN~ELSE type is detected in said detecting step, an instruction movement is performed under conditions such that substantially the same instruction exists in each of the THEN part when the conditions of the comparing instruction of the IF part are satisfied and the ELSE part when the conditions of the comparing instruction of the IF part are not satisfied and that, even if the instructions are integrated and moved to the position at which the THEN part and the ELSE part merge, an original meaning of the program is not changed, and by applying said first to six steps to the instruction sequence which was subjected to said integrating process, the instruction sequence including the branch instructions is converted into an equivalent instruction sequence including no branch instruction.

* * * * *